(12) United States Patent
Liu et al.

(10) Patent No.: US 11,263,314 B2
(45) Date of Patent: Mar. 1, 2022

(54) PROCESSOR CHECKING METHOD, CHECKING DEVICE AND CHECKING SYSTEM

(71) Applicant: TSINGHUA UNIVERSITY, Beijing (CN)

(72) Inventors: Leibo Liu, Beijing (CN); Ao Luo, Beijing (CN); Shouyi Yin, Beijing (CN); Shaojun Wei, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 547 days.

(21) Appl. No.: 16/245,898

(22) Filed: Jan. 11, 2019

(65) Prior Publication Data
US 2019/0251254 A1  Aug. 15, 2019

(30) Foreign Application Priority Data
Feb. 9, 2018 (CN) .......................... 201810140123.3

(51) Int. Cl.
*G06F 21/54* (2013.01)
*G06F 21/62* (2013.01)
*G06F 9/54* (2006.01)
*G06F 9/38* (2018.01)
*G06F 9/35* (2018.01)

(52) U.S. Cl.
CPC .............. *G06F 21/54* (2013.01); *G06F 9/35* (2013.01); *G06F 9/3836* (2013.01); *G06F 9/542* (2013.01); *G06F 21/6281* (2013.01)

(58) Field of Classification Search
USPC ........................................... 726/22
See application file for complete search history.

(56) References Cited

U.S. PATENT DOCUMENTS

| | | | |
|---|---|---|---|
| 8,024,522 B1* | 9/2011 | Favor | G06F 9/3851 711/118 |
| 9,336,385 B1* | 5/2016 | Spencer | G06F 21/56 |
| 2003/0033506 A1* | 2/2003 | Hinds | G06F 9/3857 712/217 |
| 2006/0095750 A1* | 5/2006 | Nye | G06F 9/3848 712/240 |
| 2009/0106541 A1* | 4/2009 | Mizuno | G06F 9/30058 712/239 |
| 2012/0084759 A1* | 4/2012 | Candea | G06F 9/45504 717/126 |

(Continued)

*Primary Examiner* — Sakinah White Taylor
(74) *Attorney, Agent, or Firm* — Myers Bigel, P.A.

(57) ABSTRACT

The disclosure provides a processor checking method, a checking device and a checking system. The method includes acquiring a first access record of the processor to a first memory during a running process, the first access record including reading-operation information; acquiring a second access record of a checking device to a second memory during a replay process, the second access record including first reading-operation information, the first reading-operation information being reading-operation information corresponding to a case in which a first access of the checking device to a same address during the replay process is a reading operation, and determining, based on the first access record and the second access record, whether or not the processor reads during the running process a memory address that is not any one of addresses included in the second access record.

12 Claims, 7 Drawing Sheets

(56) References Cited

U.S. PATENT DOCUMENTS

2013/0212364 A1\* 8/2013 Fetterman ............. G06F 9/3887
712/234
2018/0060215 A1\* 3/2018 Mola ................... G06F 11/3636

\* cited by examiner

US 11,263,314 B2

PROCESSOR CHECKING METHOD, CHECKING DEVICE AND CHECKING SYSTEM

CROSS-REFERENCE TO RELATED APPLICATIONS

This application claims the priority benefit of the Chinese Patent Application No. 201810140123.3 filed on Feb. 9, 2018 in the China National Intellectual Property Administration and entitled "Processor Checking Method, Checking Device and Checking System", the whole disclosure of which is incorporated herein by reference.

FIELD OF THE DISCLOSURE

The disclosure relates to a processor checking method, a checking device and a checking system.

DESCRIPTION OF THE RELATED ART

Processing capacity of modern processors is increased by simultaneously performing different tasks at various stages of a pipeline. To make this pipeline mechanism more efficient, branch prediction mechanisms and out-of-order execution mechanisms are introduced into the modern processors to execute calculations more efficiently. The branch prediction mechanism is mainly used to improve the execution efficiency by predicting and executing a code at a target address before a branch to be jumped to is completely determined. If the prediction fails, the pipeline will discard the code that is mistakenly predicted and roll back to the previous state of the processor. The out-of-order execution mechanism improves parallel execution capacity by disrupting an execution order of codes. These processor-optimized techniques are significantly helpful for the performance of modern processors. But it is recently found by security researchers that these features of modern processor architecture have a security risk that these features could be utilized by attackers in specific situations to make an attack. Therefore, there is an urgent requirement to design a security checking scheme to improve the security of the processor.

SUMMARY

According to one aspect of the present disclosure, there is provided a processor checking method. The method includes: acquiring a first access record of the processor to a first memory during a running process, the first access record including reading-operation information; acquiring a second access record of a checking device to a second memory during a replay process, wherein the checking device executes a task of the running process in a manner conforming to predefined behavior during the replay process, the predefined behavior being a hardware behavior standard of the processor, the second access record including first reading-operation information, the first reading-operation information being reading-operation information corresponding to a case in which a first access of the checking device to a same address during the replay process is a reading operation; and determining, based on the first access record and the second access record, whether or not the processor reads during the running process a memory address that is not any one of addresses included in the second access record.

Another aspect of the present disclosure provides a checking device for checking a processor. The checking device includes: a first acquiring unit configured to acquire a first access record of the processor to a first memory during a running process, the first access record including reading-operation information; a second acquiring unit configured to acquire a second access record of the checking device to a second memory during a replay process, wherein the checking device executes a task of the running process in a manner conforming to predefined behavior during the replay process, the predefined behavior being a hardware behavior standard of the processor, the second access record including first reading-operation information, the first reading-operation information being reading-operation information corresponding to a case in which a first access of the checking device to a same address during the replay process is a reading operation; and a first determining unit configured to determine, based on the first access record and the second access record, whether or not the processor reads during the running process a memory address that is not any one of addresses included in the second access record.

According to another aspect of the present disclosure, there is provided a checking system for checking a processor to be checked. The checking system includes: one or more checking processors; a storage for storing one or more programs, wherein the one or more checking processors are configured to execute the above method when the one or more programs are executed by the one or more checking processors.

According to another aspect of the present disclosure, there is provided a computer readable storage medium on which instructions for executing the above method are stored.

BRIEF DESCRIPTION OF THE DRAWINGS

In order to understand the present disclosure and its advantages more completely, reference will now be made to the following description in connection with the drawings, in which.

DETAILED DESCRIPTION OF EMBODIMENTS

Figure 1:
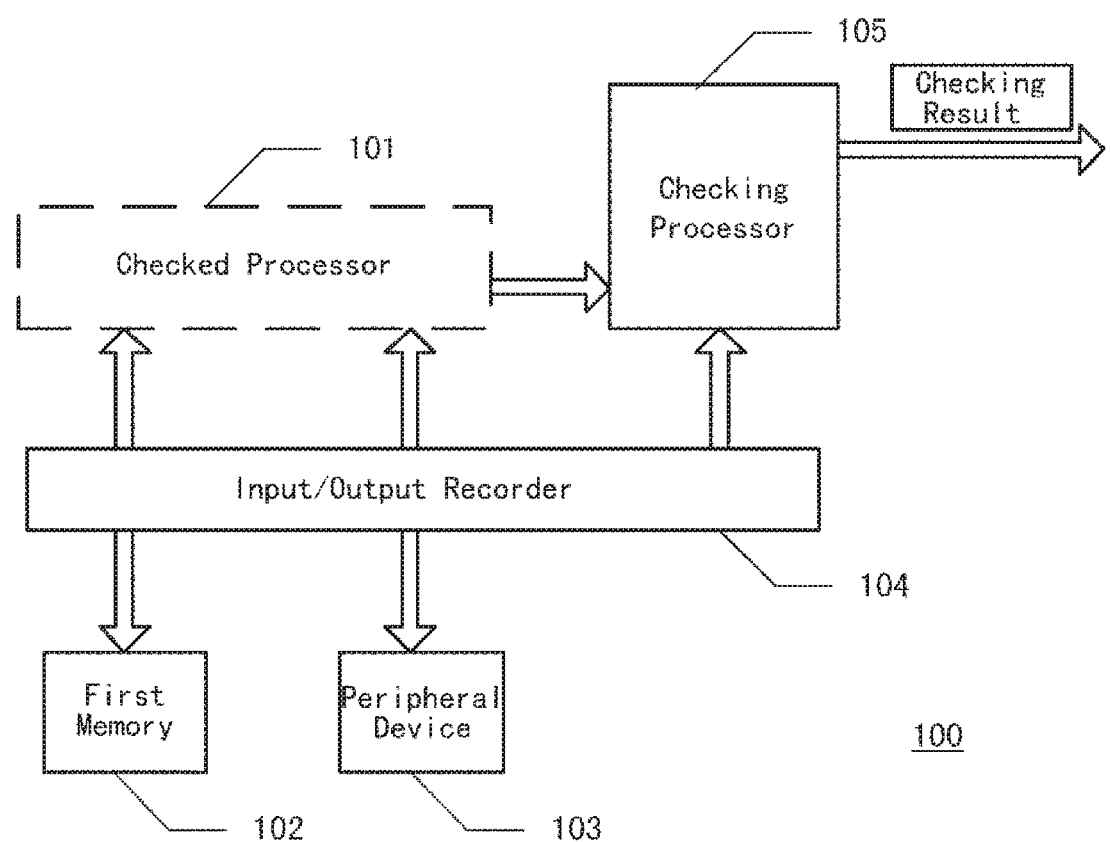
FIG. 1 schematically illustrates an exemplary system architecture 100 of a processor checking method, a checking device, and a checking system according to an embodiment of the present disclosure.

Hereinafter, embodiments of the present disclosure will be described with reference to the drawings. However, it should be understood that the description is only illustrative, and is not intended to limit the scope of the disclosure. In addition, description of well-known structures and techniques is omitted in the following description in order to avoid unnecessarily obscuring the inventive concept. In addition, the various embodiments and the technical features of the embodiments provided below may be combined with each other in any manner.

The terminologies used herein are for the purpose of describing particular embodiments and are not intended to limit the present disclosure. In addition, the terms such as "including", "comprising" and the like are used to indicate the presence of the features, steps, operations and/or components, but do not exclude the presence or addition of one or more other features, steps, operations or components.

All terminologies (including technical and scientific terminologies) used herein have the meaning commonly understood by one of ordinary skill in the art, unless otherwise defined. It should be noted that the terminologies used herein are to be interpreted as having a uniform meaning in the context of the present specification and should not be interpreted in an ideal or rigid manner.

Some block diagrams and/or flow charts are shown in the drawings. It should be understood that some blocks in the block diagrams and/or flow charts, or a combination thereof, may be implemented by computer program instructions. These computer program instructions may be provided to a general purpose computer, a dedicated computer or a processor of other programmable data processing apparatus such that these instructions may be used to construct a device for implementing the functions/operations illustrated in the block diagrams and/or flow charts when executed by the processor.

Thus, the techniques of this disclosure may be implemented in the form of hardware and/or software (including firmware, microcode, etc.). Additionally, the techniques of this disclosure may take the form of a computer program product on a computer readable medium stored with instructions and used by or in connection with an instruction execution system. In the context of the present disclosure, a computer readable medium may be any medium that may contain, store, transfer, transmit or transport the instructions. For example, the computer readable medium may include, but is not limited to, an electronic, magnetic, optical, electromagnetic, infrared, or semiconductor system, apparatus, device, or transmission medium. Specific examples of the computer readable medium include: a magnetic storage device such as a magnetic tape or a hard disk (HDD); an optical storage device such as a compact disk (CD-ROM); a storage such as a random access memory (RAM) or a flash memory; and/or a wired/wireless communication link.

According to the newly disclosed "Meltdown" and "Spectre" attacks, the attacker repeatedly uses the CPU instruction to clear an address of the memory out of the CPU cache (the process of clearing is referred to Flush). After a period of time, the memory data at the address is read and the reading time is measured (the reading and the measurement are referred to Reload). In this way, by this "Flush+Reload" method, the attacker may clearly know whether the address has been read by the target program during this period of time, and then reversely infers some sensitive information. This is because once the target program reads the address, its corresponding memory will enter the CPU cache, which will cause a time delay of the attacker's access to the address to drop significantly. Under the branch prediction mechanism and the out-of-order execution mechanism, the above attack mode may steal the confidential information in the processor, which is a great security threat to the processor.

For the above security problem, an embodiment of the present disclosure provides a processor checking method, a checking device, and a checking system. The method includes: acquiring a first access record of the processor to a first memory during a running process, wherein the first access record includes reading-operation information; acquiring a second access record of a checking device to a second memory during a replay process, wherein the checking device executes a task of the running process in a manner conforming to predefined behavior during the replay process, the predefined behavior being a hardware behavior standard of the processor, the second access record including first reading-operation information, the first reading-operation information being reading-operation information corresponding to a case in which a first access of the checking device to a same address during the replay process is a reading operation; and determining, based on the first access record and the second access record, whether or not the processor reads during the running process a memory address that is not any one of addresses included in the second access record.

If it is found through the checking that the processor reads the memory address that is not included in the second access record, a security forewarning message may be issued to the user, so that a user may take corresponding control measures according to his own requirements (such as cutting off the data transmission, turning off the processor, or the like), thereby preventing potential security risks from being maliciously used. The technical solutions of the embodiment of the disclosure may effectively prevent the security problem caused by the above malicious use of the security risks without affecting the efficient running performance of the processor. For example, the security risks caused by the ineffective predicted execution behavior may be particularly prevented from being maliciously used, which otherwise may lead to a leakage of confidential data, greatly improving the security of the processor.

It should be understood that the embodiments of the present disclosure are not limited to the application scenarios of the above-mentioned "Meltdown" and "Spectre" attacks. The two attack modes are only examples for facilitating understanding of the embodiments of the present disclosure. The scope of protection of the present disclosure should be based on the technical features defined in the claims.

According to the technical solutions of the embodiment of the present disclosure, the behavior of the processor reading data from the first memory is checked and analyzed, and the security of the processor may be improved without affecting the efficient running performance of the processor. For example, the security risks caused by the ineffective predicted execution behavior may be particularly prevented from being maliciously used, which otherwise may lead to a leakage of confidential data, improving the security of the processor.

FIG. 1 schematically illustrates an exemplary system architecture 100 of a processor checking method, a checking device, and a checking system according to an embodiment of the present disclosure.

As shown in FIG. 1, the exemplary system architecture 100 includes a processor 101 to be checked, a first memory 102, a peripheral device 103, an input/output recorder 104, and a checking processor 105. During the running process of the checked processor 101, the processor exchanges data with the first memory 102 and/or the peripheral device 103. The input/output recorder 104 is disposed between the checked processor and the first memory 102 and/or the peripheral device 103, and can record interaction information between the checked processor 101 and the first memory 102 and/or the peripheral device 103 during the running process. During the running process, all access operations of the checked processor 101 will be performed via the input/output recorder 104 and are recorded by the input/output recorder 104. The input/output recorder 104 sequentially records the access operations of the checked processor 101 in a sequential order of operations, forming an access sequence sorted in a time order.

The access sequence may include reading and writing operations to the first memory 102 by the checked processor 101, reading and writing operations to the peripheral device 103 by the checked processor 101, and/or reading and writing operations initiated by the peripheral device 103. The embodiments of the present disclosure may implement security checking on the checked processor 101 based on the above system architecture 100.

It should be understood that the system architecture 100 is only an example of application scenarios of the embodiments of the present disclosure, and the embodiments of the present disclosure are not limited thereto. For example, the embodiments of the present disclosure may not utilize input and output recorder 104, which is a hardware device, to record the access of the checked processor 101 to the first memory during the running process, but the recording is implemented by software or a combination of software and hardware.

Figure 2:
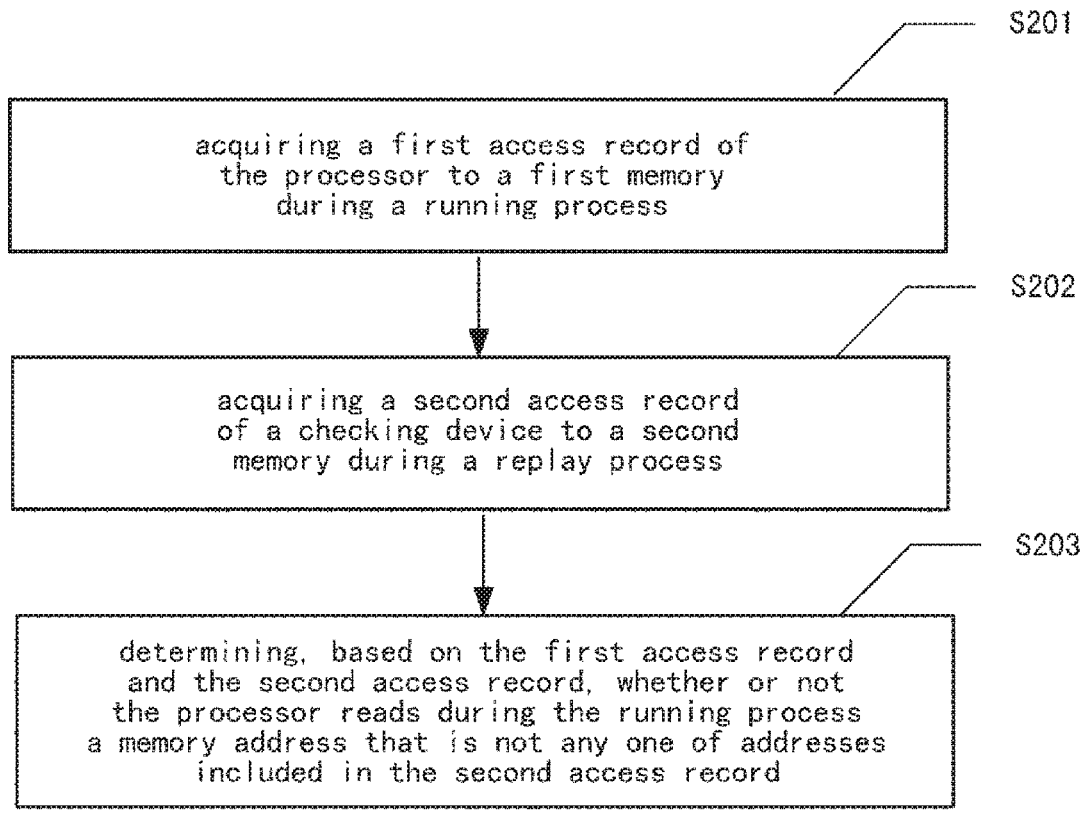
FIG. 2 schematically illustrates a flow chart of a processor checking method according to an embodiment of the disclosure.

The process of executing security checking on the checked processor 101 based on the access record stored in the input/output recorder 104 according to the embodiments of the present disclosure will be described in detail below with reference to FIG. 2. FIG. 2 schematically illustrates a flow chart of a processor checking method according to an embodiment of the disclosure. This checking method may be executed by the checking processor 105. As shown in FIG. 2, the checking method includes operations S201, S202, and S203.

In operation S201, a first access record of a checked processor (e.g., the checked processor 101) to a first memory (e.g., the first memory 102) during the running process of the checked processor is acquired, the first access record including reading-operation information. In the application scenario of FIG. 1, the access record required to check the checked processor in an embodiment of the present disclosure may be read from the input/output recorder 104. In an example, corresponding time information indicates the time when the reading operation occurs.

It should be understood that the frequency of acquiring access record is not intended to be limited in the present disclosure. For example, the access record recorded in the input/output recorder 104 may be read in real time. As another example, a time interval may be set in advance, and the access record recorded by the input/output recorder 104 during the time interval may be read at a period of the time interval. In an example, the length of the time interval may be set according to the real-time requirement for checking.

In operation S202, a second access record of a checking device (for example, the checking processor 105 which may be a main component of the checking device) to the second memory during a replay process is acquired. In an example, the checking device executes a task of the running process in a manner conforming to predefined behavior during the replay process, and the predefined behavior is a hardware behavior standard of the processor. The second access record includes first reading-operation information, and the first reading-operation information is reading-operation information corresponding to a case in which a first access of the checking device to a same address during the replay process is a reading operation.

For example, the real-time running process of the checked processor 101 may be divided into one or more checking intervals. For example, the entire running process of the checked processor from boot or starting-up to shutdown may be considered as a target running process, or the entire running process may be divided into multiple target running processes corresponding to multiple checking intervals. In this way, when the processor is checked for security, the security checking may be implemented as a security checking for the running process of the processor in a certain checking interval (i.e., the target running process).

When the security checking is executed, an initial running state of the checking device is set according to initial running state information of the checked processor 101 in the target running process, input information of the checked processor 101 in the target running process is used as input information of the checking device, and then the checking device is caused to execute a task of the target running process in a manner conforming to predefined behavior. In the embodiment of the present disclosure, executing a task of the target running process in a manner conforming to predefined behavior is referred to a replay process. In this way, a second access record to the second memory by the checking device during the replay process may be acquired as a comparison reference for the checking analysis.

It should be understood that the above term "second memory" mentioned in the above expression "acquiring a second access record of a checking device to the second memory" may be not a memory that really exists. In the embodiment of the present disclosure, according to different implementations of the checking device, the "second memory" may be implemented as various forms of storage. The "second memory" of the checking device refers to a storage that is logically equivalent to the memory of the checked processor. Therefore, the "second memory" of the checking device should not be understood as a specific form of storage.

It should also be understood that the checking device does not employ during the replay process a mechanism which may bring about a predicted execution behavior, such as a branch prediction mechanism, an out-of-order execution mechanism, or the like, and that the checking device only reads corresponding data from the second memory according to the instructions actually executed.

It should also be understood that the predefined behavior is a hardware behavior standard of the processor which refers to the behavioral criteria of the processor in the process of parsing and executing the software instruction stream. In one embodiment, the hardware behavior standard of the processor may be the behavioral criteria specified in the processor specification or other normalized documentation. For example, for an instruction set processor, predefined behaviors may include, but are not limited to, an instruction behavior specified in the instruction set implemented by the processor, a response and processing behavior for an interrupt, and a behavior of the input/output ports of the processor. In one embodiment, the processor in the checking device may be designed in advance according to the hardware behavior standard of the checked processor, and then the checking device is caused to conform to predefined behaviors during the running process. In another embodiment, the checking device may be implemented using a reconfigurable processor. In this case, an algorithm may be written in advance according to the hardware behavior standard of the processor, and the algorithm is stored in the storage of the checking device. In this way, when the checking device starts running, the relevant algorithm may be read from the storage and reconstructed according to the algorithm, so that the checking device meets the requirements of the predefined behavior during the replay process.

In operation S203, based on the first access record and the second access record, it is determined whether or not the checked processor (e.g., the checked processor 101) reads a memory address, that is not any one of addresses included in the second access record, during the running process. For example, the address items included in the first access record and the address items included in the second access record are sequentially traversed, and they are compared to determine whether the first access record contains more address items. If the first access record contains more address terms, it is demonstrated that the checked processor (e.g., the checked processor 101) reads memory contents other than the actual execution instruction requirements during the running process. Then, a forewarning message may be issued to the user, or a further checking and analysis may be performed to prevent leakage of confidential data in the processor.

According to the technical solutions of the embodiment of the present disclosure, checking and analysis for the behavior of the checked processor reading data from the first memory may improve the security of the processor without affecting the efficient running performance of the processor. For example, in particular, the security risks caused by the ineffective predicted execution behavior may be prevented from being maliciously used, which otherwise may lead to the leakage of confidential data, improving the security of the processor.

The beneficial effects of the checking method of the embodiments of the present disclosure when the checked processor 101 encounters both "Meltdown" and "Spectre" attacks will be described in detail below. It is supposed that an attacker writes a malicious program and places it in the checked processor 101 to run. During the running process, the malicious program will repeatedly call the CPU instruction to clear the cache, and utilize the branch prediction mechanism to prefetch some confidential data in the first memory and write it to the cache. Since the security check such as permission check is not effectively executed under the branch prediction mechanism, the confidential data will then be smoothly read from the first memory to the cache. According to the technical solutions of the embodiment of the present disclosure, the operation of the checked processor to read the confidential data from the first memory will be recorded in the first access record. In this way, the second access record of the checking device during the replay process is utilized as a comparison reference in the present disclosure, and the memory reading-operation executed by the malicious program may be checked and analyzed. Then a security forewarning message may be issued in time so that security measures may be taken timely to prevent the side channel attacks, greatly improving the security of the processor.

Figure 3:
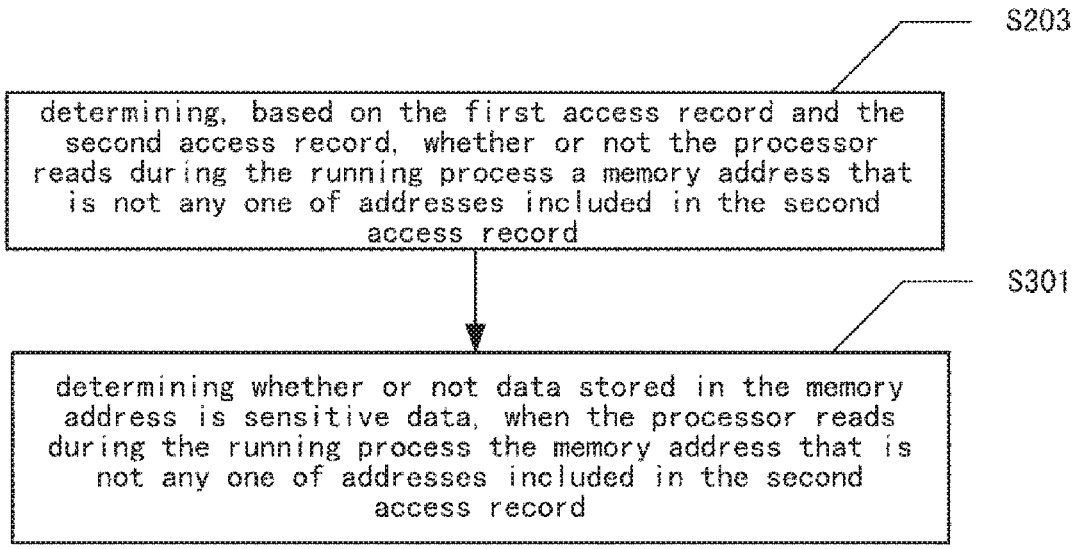
FIG. 3 schematically illustrates a flow chart of a processor checking method according to another embodiment of the present disclosure.

FIG. 3 schematically shows a flow chart of a processor checking method according to another embodiment of the present disclosure. The method may be executed by the checking processor 105.

As shown in FIG. 3, the method includes an operation S203 and an operation S301. In operation S203, based on the first access record and the second access record, it is determined whether or not the checked processor (e.g., the checked processor 101) reads during the running process a memory address that is not any one of addresses included in the second access record. In operation S301, if the checked processor reads during the running process a memory address that is not any one of addresses included in the second access record, it is determined whether or not the data stored in the memory address is a sensitive data.

For example, a user may predefine attributes of sensitive data (e.g., data format and the like). In this case, if it is checked in operation S203 that the checked processor 101 executes a reading operation with a security risk, it may be further judged in operation S301 according to the data format of the data stored in the memory address whether or not the data stored in the memory address is a sensitive data predefined by user. If it is the sensitive data that is predefined by the user, security forewarning may be issued to the user. If it does not belong to the sensitive data predefined by user, it may be considered that the security risk will not cause an actual leakage problem of confidential data, and no security forewarning will be issued to the user.

Figure 4:
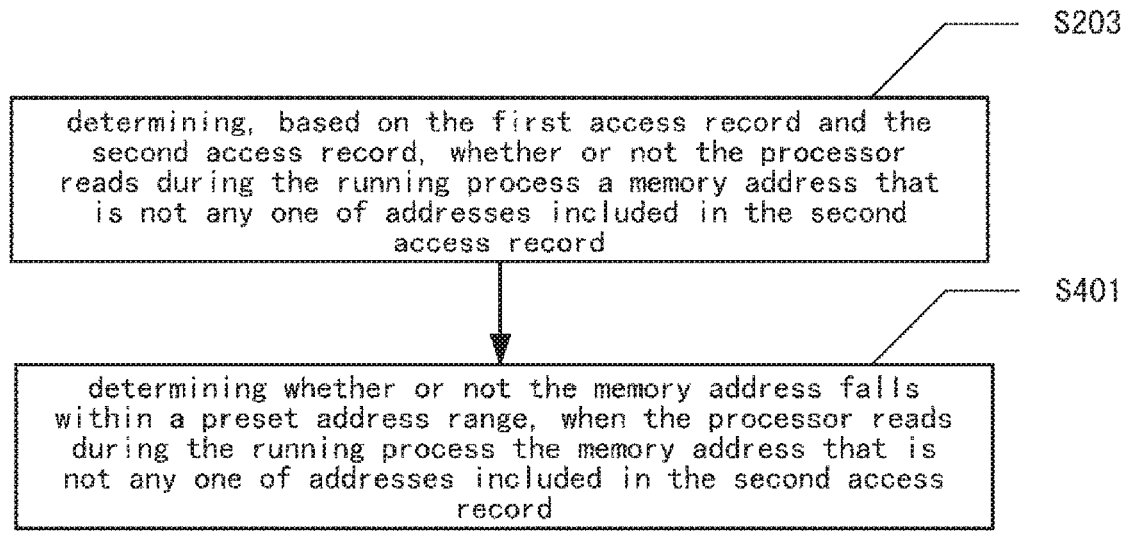
FIG. 4 schematically illustrates a flow chart of a processor checking method according to a further embodiment of the present disclosure.

FIG. 4 schematically illustrates a flow chart of a processor checking method according to a further embodiment of the present disclosure. The method may be executed by the checking processor 105.

As shown in FIG. 4, the method includes an operation S203 and an operation S401. In operation S203, based on the first access record and the second access record, it is determined whether or not the checked processor (e.g., the checked processor 101) reads during the running process a memory address that is not any one of addresses included in the second access record. In operation S401, if the checked processor reads during the running process a memory address that is not any one of addresses included in the second access record, it is determined whether or not the memory address that is not any one of addresses included in the second access record falls within a preset address range.

For example, a user may predefine one or more segments of address ranges with high security requirements. In this case, if it is checked in operation S203 that the checked processor 101 executes a reading operation with a security risk, it may be further determined in operation S401 whether or not the memory address falls within a preset address range. If it falls within the preset address range, a security forewarning message may be issued to the user. If it does not fall within the preset address range, it may be considered that the security risk will not cause the actual leakage problem of confidential data, and no security forewarning will be issued to the user.

Figure 5:
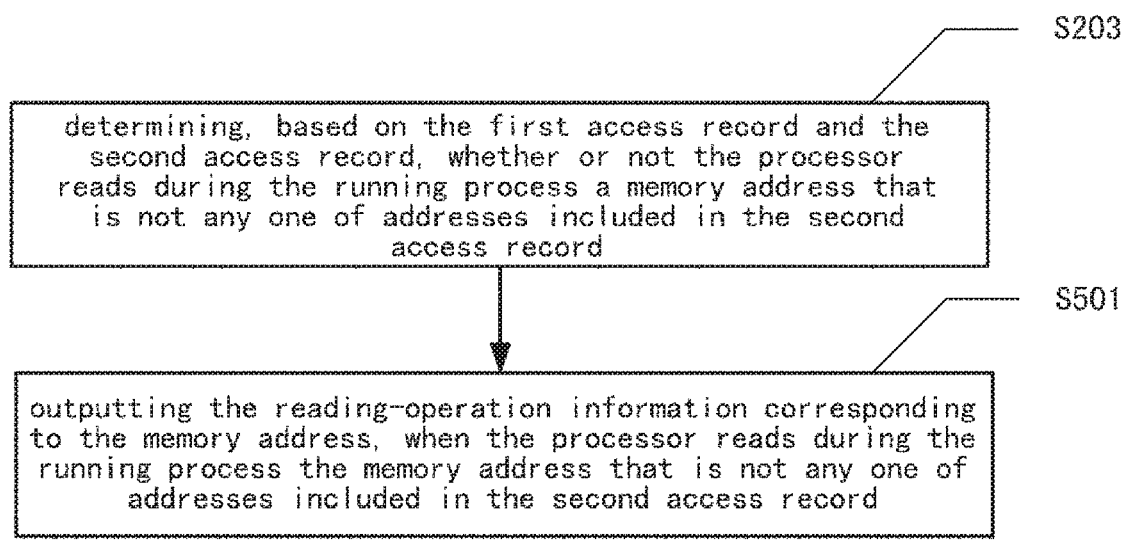
FIG. 5 schematically illustrates a flow chart of a processor checking method according to a still further embodiment of the present disclosure.

FIG. 5 schematically illustrates a flow chart of a processor checking method according to another embodiment of the present disclosure. The method may be executed by the checking processor 105.

As shown in FIG. 5, the method includes an operation S203 and an operation S501. In operation S203, based on the first access record and the second access record, it is determined whether or not the checked processor (e.g., the checked processor 101) reads during the running process a memory address that is not any one of addresses included in the second access record. In operation S501, if the checked processor reads during the running process the memory address that is not any one of addresses included in the second access record, the reading-operation information corresponding to the memory address that is not any one of addresses included in the second access record is output, so that the user may optimize the corresponding program code according to the output information.

For example, after the above-described reading-operation information is determined, the positions where respective reading-operations corresponding to the above-described reading-operation information are executed in the program are sequentially determined. Then, the LFENCE instruction is sequentially added at each position (the predicted execution behavior at the respective position will be blocked after the LFENCE instruction is added) to determine whether a redundant reading operation (i.e., a reading operation with a security risk) checked by the above checking is reduced. If the above redundant reading operation is reduced, it is shown that the program code at the corresponding position brings a predicted execution behavior with a security risk, so the user may modify the corresponding code to clear the predicted execution behavior caused by executing the part of the code, and thus repeat until the program code is optimized up to the absence of the above redundant reading operations.

Figure 6:
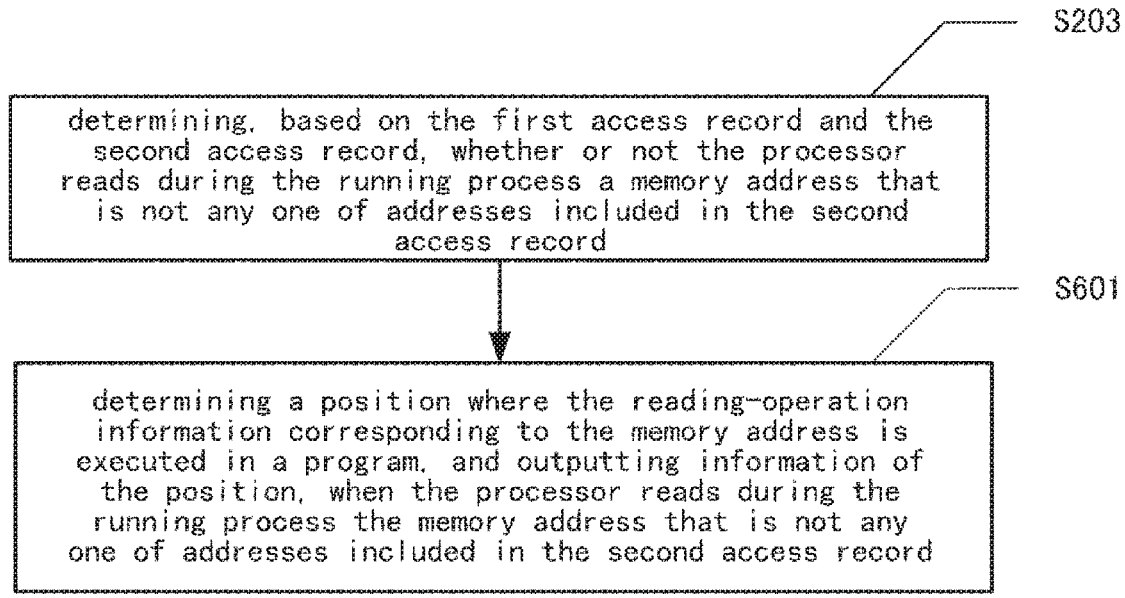
FIG. 6 schematically illustrates a flow chart of a processor checking method according to a yet another of the present disclosure.

FIG. 6 schematically illustrates a flow chart of a processor checking method according to another embodiment of the disclosure. The method may be executed by the checking processor 105.

As shown in FIG. 6, the method includes an operation S203 and an operation S601. In operation S203, based on the first access record and the second access record, it is determined whether or not the checked processor (e.g., the checked processor 101) reads during the running process a memory address that is not any one of addresses included in the second access record. In operation S601, if the checked processor reads during the running process the memory address that is not any one of addresses included in the second access record, a position where the reading-operation information corresponding to the memory address that is not any one of addresses included in the second access record is executed in the program is determined and the information of the position is output, so that the user may optimize the corresponding program code according to the output information. In this way, the user may optimize the program directly according to the position information, thereby improving working efficiency.

Figure 7:
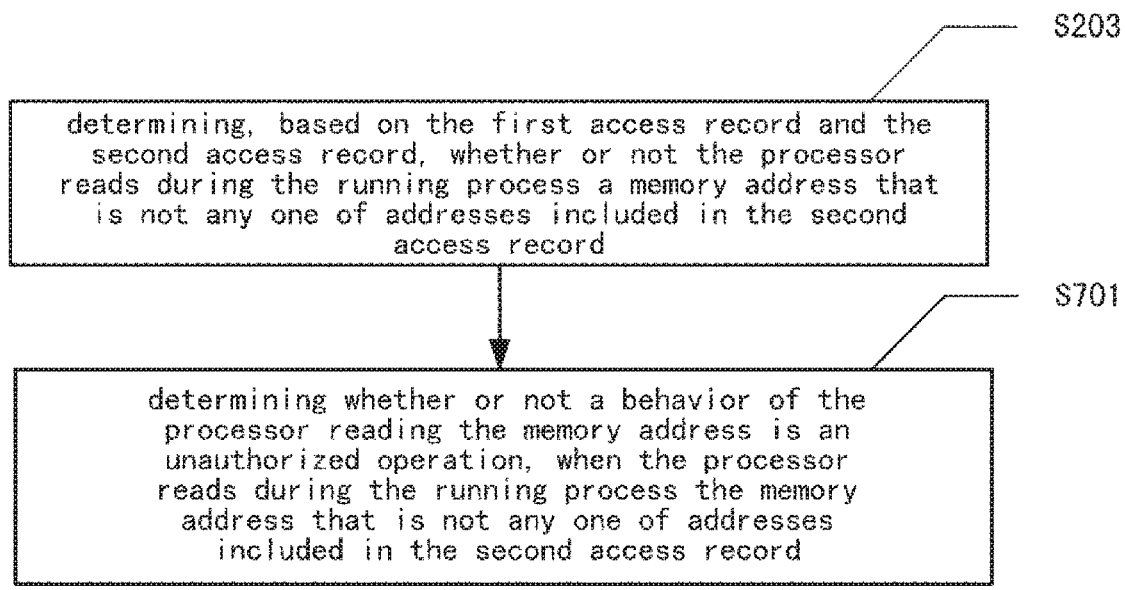
FIG. 7 schematically illustrates a flow chart of a processor checking method according to a yet further embodiment of the present disclosure.

FIG. 7 schematically illustrates a flow chart of a processor checking method according to another embodiment of the present disclosure. The method may be executed by the checking processor 105.

As shown in FIG. 7, the method includes an operation S203 and an operation S701. In operation S203, based on the first access record and the second access record, it is determined whether or not the checked processor (e.g., the checked processor 101) reads during the running process a memory address that is not any one of addresses included in the second access record. In operation S701, if the checked processor reads during the running process the memory address that is not any one of addresses included in the second access record, it is determined whether or not the behavior of the processor reading the memory address is an unauthorized operation.

For example, it is checked whether or not the reading operation corresponding to the reading-operation information is an authorized processor behavior. If it is an unauthorized operation, security forewarning may be issued to the user, and otherwise the reading operation may be deemed as being legal and the checking and analysis for the reading operation is terminated. Specifically, all the page tables may be traversed, and the access rights corresponding to the respective pages are acquired, thereby acquiring the memory address range corresponding to the each level of access rights. Then, it is judged which one of levels of access rights corresponds to the memory address range within which the address item in the reading-operation information falls, and the access right which is given to the processor when the processor executes the reading operation corresponding to the reading-operation information is checked. If the access right of the processor is lower than the access right to which the address item in the reading-operation information belongs, the behavior of the processor reading the memory address is considered to be an unauthorized operation, and otherwise it is not an unauthorized operation. Since the access right of the processor is determined in a specific time period in this embodiment, the first access record further includes time information corresponding to respective reading-operation information.

Figure 8:
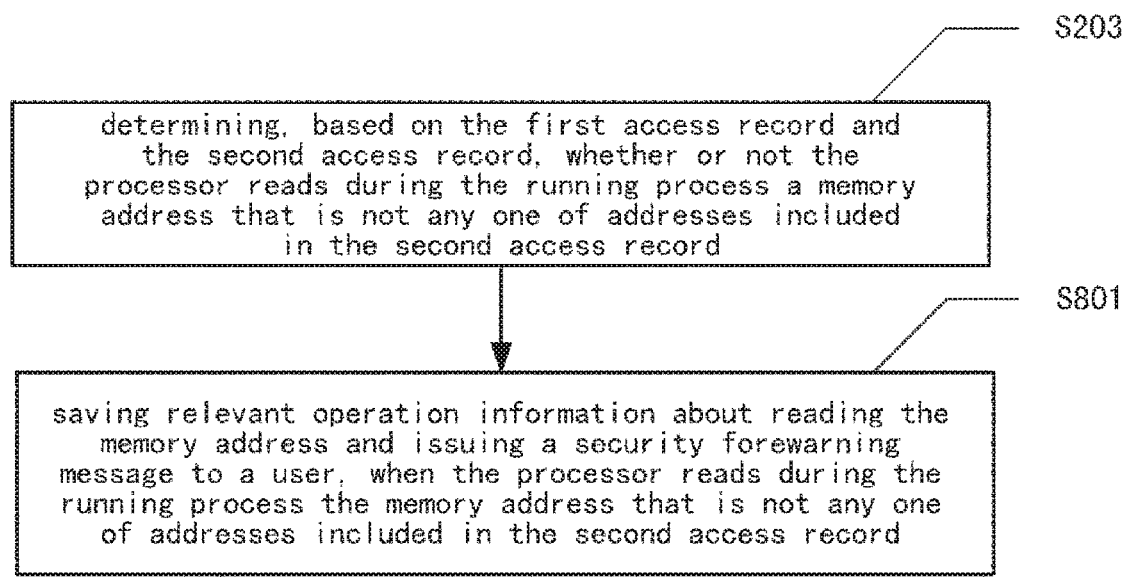
FIG. 8 schematically illustrates a flow chart of a processor checking method according to a still another embodiment of the present disclosure.

FIG. 8 schematically illustrates a flow chart of a processor checking method according to another embodiment of the disclosure. The method may be executed by the checking processor 105.

As shown in FIG. 8, the method includes an operation S203 and an operation S801. In operation S203, based on the first access record and the second access record, it is determined whether the checked processor (e.g., the checked processor 101) reads during the running process a memory address that is not any one of addresses included in the second access record. In operation S801, if the checked processor reads during the running process the memory address that is not any one of addresses included in the second access record, the relevant operation information about reading the memory address is saved, and security forewarning is issued to the user, so that the user may take appropriate control measures (such as cutting off data transmission, shutting down the processor, or the like) according to his own requirements to prevent potential security risks from being maliciously used.

Alternatively, in an embodiment, when the checked processor is a multi-core processor, the first access record further includes an identifier of a processor core to which the reading-operation information relates. For example, when the input/output recorder 104 records the access record of the checked processor 101, the identifier of the processor core to which the access record relates may be added during the recording process. In this way, when security checking for the checked processor 101 is executed, security checking may be executed separately for each processor core. According to the embodiment of the present disclosure, the accuracy of the security checking and the security forewarning may be improved.

Figure 9:
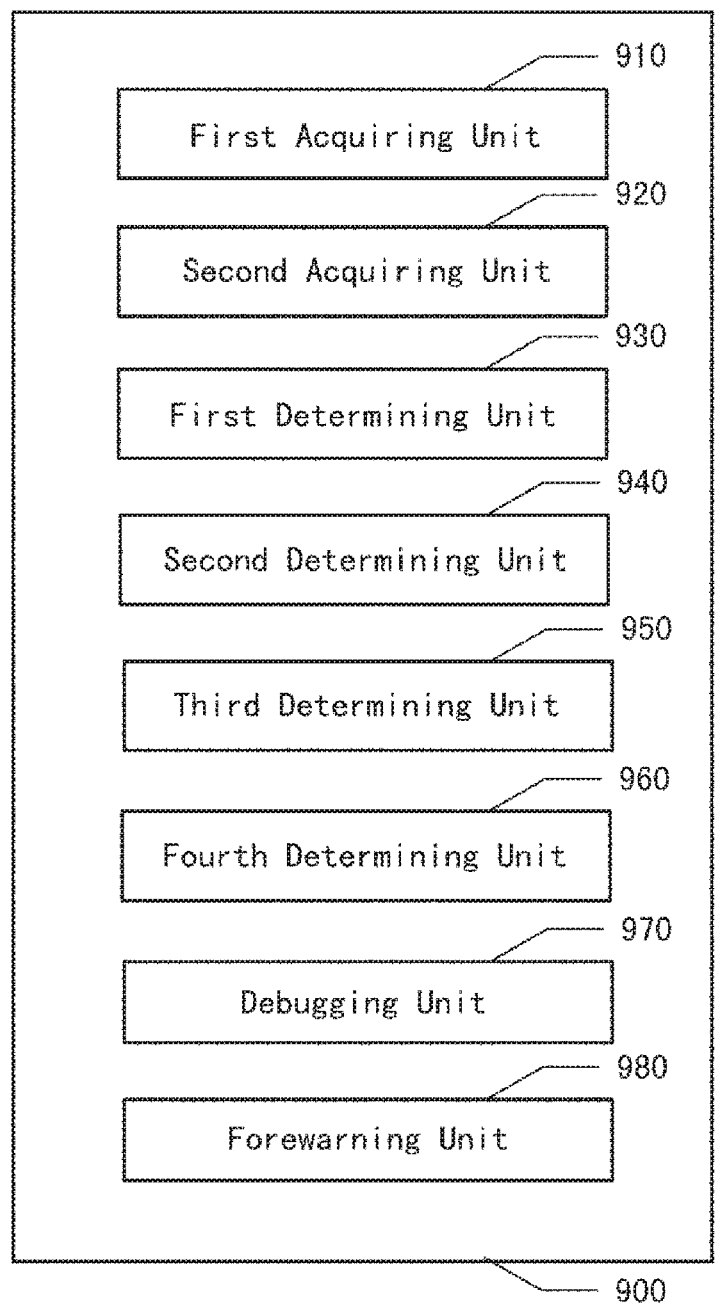
FIG. 9 is a block diagram schematically showing a checking device for checking a processor according to an embodiment of the present disclosure.

FIG. 9 is a block diagram schematically showing a checking device for checking a processor according to an embodiment of the present disclosure. As shown in FIG. 9, the checking device 900 includes a first acquiring unit 910, a second acquiring unit 920, a first determining unit 930, a second determining unit 940, a third determining unit 950, a fourth determining unit 960, a debugging unit 970 and a forewarning unit 980. The checking device 900 is used to execute the methods shown in FIGS. 2 to 8. In order to avoid repetition, the same technical description is omitted here.

The first acquiring unit 910 is configured to acquire a first access record of the checked processor to the first memory in the running process. The first access record includes reading-operation information. The second acquiring unit 920 is configured to acquire a second access record of the checking device to the second memory in the replay process. The checking device executes a task of the running process in a manner conforming to predefined behavior during the replay process. The predefined behavior is a hardware behavior standard of the processor. The second access record includes first reading-operation information, and the first reading-operation information is reading-operation information corresponding to a case in which a first access of the checking device to a same address during the replay process is a reading operation. The first determining unit 930 is configured to determine, based on the first access record and the second access record, whether or not the checked processor reads during the running process a memory address that is not any one of addresses included in the second access record.

The checking device 900 according to the embodiment of the present disclosure checks and analyzes the behavior of the processor reading data from the first memory, and may improve the security of the processor without affecting the efficient running performance of the processor. For example, the security risks caused by the ineffective predicted execution behavior may be particularly prevented from being maliciously used, which otherwise may lead to the leakage of confidential data, improving the security of the processor.

Optionally, in an embodiment, the checking device 900 further includes a second determining unit 940 configured to: when the checked processor reads during the running process the memory address that is not any one of addresses included in the second access record, determine whether or not the data stored in the memory address that is read by the checked processor but not any one of addresses included in the second access record is a sensitive data.

Optionally, in an embodiment, the checking device 900 further includes a third determining unit 950 configured to: when the checked processor reads during the running process the memory address that is not any one of addresses included in the second access record, determine whether or not the memory address that is read by the checked processor but not any one of addresses included in the second access record falls within a preset address range.

Optionally, in an embodiment, the checking device 900 further includes a fourth determining unit 960 configured to: when the checked processor reads during the running process the memory address that is not any one of addresses included in the second access record, determine whether or not the behavior of the checked processor reading the memory address that is not any one of addresses included in the second access record is an unauthorized operation.

Optionally, in one embodiment, the checking device 900 further includes a debugging unit 970. The debugging unit 970 is configured to: when the checked processor reads during the running process the memory address that is not any one of addresses included in the second access record, output the reading-operation information corresponding to the memory address that is not any one of addresses included in the second access record so that the corresponding program code may be optimized.

Optionally, in an embodiment, the debugging unit 970 is configured to: when the checked processor reads during the running process a memory address that is not any one of addresses included in the second access record, determine a position where the reading-operation information corresponding to the memory address that is not any one of addresses included in the second access record is executed in the program and output information of the position so that the corresponding program code may be optimized.

Optionally, in an embodiment, the checking device 900 further includes a forewarning unit 980. The forewarning unit 980 is configured to: when the checked processor reads during the running process the memory address that is not any one of addresses included in the second access record, save the relevant operation information about reading the memory address and issue a security forewarning message to the user.

Optionally, in an embodiment, when the checked processor is a multi-core processor, the first access record further includes an identifier of a processor core to which the reading-operation information relates.

It should be understood that the first acquiring unit 910, the second acquiring unit 920, the first determining unit 930, the second determining unit 940, the third determining unit 950, the fourth determining unit 960, the debugging unit 970, and the forewarning unit 980 may be incorporated and implemented in one module, or any one of them may be split into multiple modules.

Alternatively, at least some of the functions of one or more of the modules may be combined with at least some of the functions of the other modules and implemented in one module. According to an embodiment of the present disclosure, at least one of the first acquiring unit 910, the second acquiring unit 920, the first determining unit 930, the second determining unit 940, the third determining unit 950, the fourth determining unit 960, the debugging unit 970, and the forewarning unit 980 may be implemented at least partially as a hardware circuit, such as a field programmable gate array (FPGA), a programmable logic array (PLA), a System on Chip, a system on a substrate, a system on a package, or an application specific integrated circuit (ASIC)), may be implemented in hardware or firmware in any other reasonable manner to integrate or package the circuit, or may be implemented in a suitable combination of software, hardware, and firmware.

Alternatively, at least one of the first acquiring unit 910, the second acquiring unit 920, the first determining unit 930, the second determining unit 940, the third determining unit 950, the fourth determining unit 960, the debugging unit 970, and the forewarning unit 980 may be at least partially implemented as a computer program module that may execute the function of the corresponding module when executed by a computer.

Figure 10:
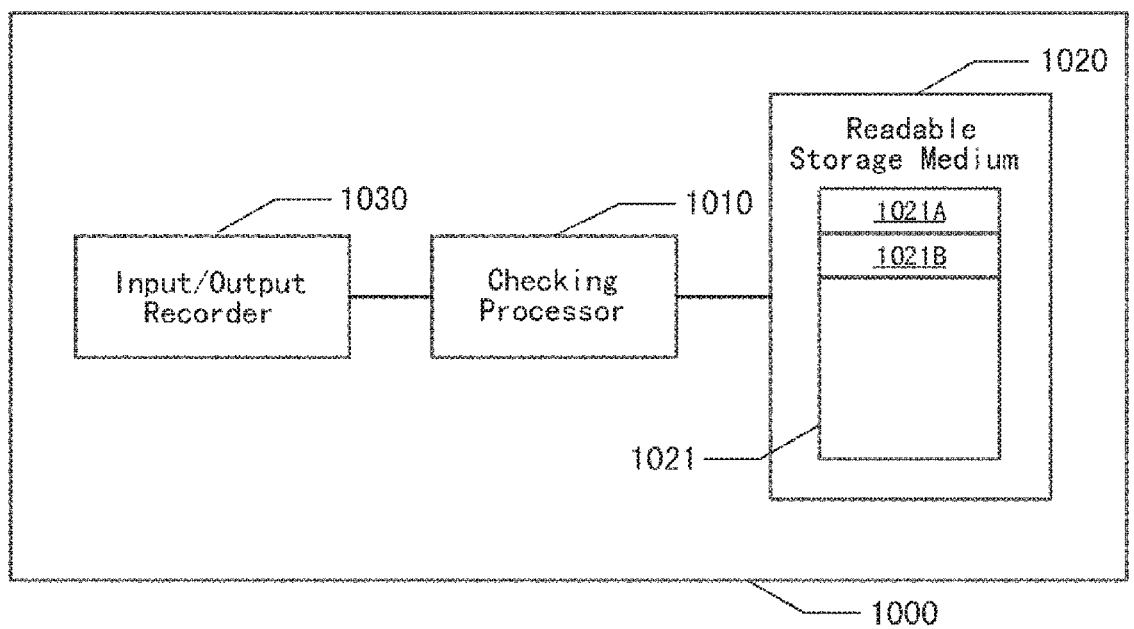
FIG. 10 schematically illustrates a block diagram of a checking system 1000 for checking a processor according to another embodiment of the present disclosure.

FIG. 10 schematically illustrates a block diagram of a checking system 1000 for checking a processor according to another embodiment of the present disclosure. As shown in FIG. 10, the checking system 1000 includes a checking processor 1010, a computer readable storage medium 1020, and an input/output recorder 1030. The checking processor 1010 is one of the specific embodiments of the checking processor 105, and the input/output recorder 1030 is one of the specific embodiments of the input/output recorder 104. The checking system 1000 may execute the method described above with reference to FIGS. 2-8 to check the checked processor 101.

In particular, the checking processor 1010 may include, for example, a general purpose microprocessor, an instruction set processor, and/or a related chipset and/or a reconfigurable processor and/or a special purpose microprocessor (e.g., an application specific integrated circuit (ASIC)), and the like. The checking processor 1010 may further include an onboard memory for a caching purpose. The checking processor 1010 may include a single processing unit or a plurality of processing units for executing different actions of method flow according to embodiments of the present disclosure described with reference to FIGS. 2-8.

The computer readable storage medium 1020 may be, for example, any medium that can contain, store, transfer, transmit or transport instructions. For example, the readable storage medium may include, but is not limited to, an electronic, magnetic, optical, electromagnetic, infrared, or semiconductor system, apparatus, device, or transmission medium. Specific examples of the readable storage medium may include: a magnetic storage device such as a magnetic tape or a hard disk (HDD); an optical storage device such as a compact disk (CD-ROM); a storage such as a random access memory (RAM) or a flash memory; and/or a wired/wireless communication link.

The computer readable storage medium 1020 may include a computer program 1021. The computer program 1021 may include code/computer executable instructions that, when executed by the checking processor 1010, cause the checking processor 1010 to execute, for example, the method flow described above in connection with FIGS. 2-8 and any variants thereof.

The computer program 1021 may be configured to include computer program code, for example, including a computer program module. For example, in an exemplary embodiment, the code in the computer program 1021 may include one or more program modules, including, for example, module 1021A, module 1021B, . . . , and the like. It should be noted that the division manner and number of modules are variable, and those skilled in the art may use suitable program modules or program module combinations according to actual conditions, and when these program module combinations are executed by the checking processor 1010, the checking processor 1010 is made able to execute, for example, the method flow described above in connection with FIGS. 2-8 and any variations thereof.

According to an embodiment of the present disclosure, the input/output recorder 1030 is configured to record input/output information of the checked processor 101 during the running process. The checking processor 1010 may interact with the input/output recorder 1030 to execute the method flow described above in connection with FIGS. 2-8 and any variations thereof.

According to an embodiment of the present disclosure, at least one of the first acquiring unit 910, the second acquiring unit 920, the first determining unit 930, the second determining unit 940, the third determining unit 950, the fourth determining unit 960, the debugging unit 970, and the forewarning unit 980 may be implemented as a computer program module described with reference to FIG. 6, and they may implement the corresponding operations described above when executed by the checking processor 1010.

The above described methods, apparatus, units and/or modules according to various embodiments of the present disclosure may be implemented by executing software including computer instructions through an electronic apparatus with computing capability. The system may include storage devices to implement the various storage functions described above. The electronic apparatus with computing capability may include, but is not limited to, a device capable of executing computer instructions such as a general purpose processor, a digital signal processor, a dedicated processor, a reconfigurable processor, and the like. Executing such instructions may require the electronic apparatus to be configured to execute the operations described above according to the present disclosure. The above devices and/or modules may be implemented in one electronic apparatus or in different electronic apparatus. The software may be stored in a computer readable storage medium. The computer readable storage medium stores one or more programs (software modules) including instructions that cause the electronic apparatus to execute the method of the present disclosure when executed by one or more processors in the electronic apparatus.

The software may be stored in a volatile memory or a non-volatile storage device (for example, a storage device such as a ROM), regardless of being erasable or rewritable, or stored in the form of a storage (e.g., RAM, memory chip, device or integrated circuit), or stored in an optically readable medium or a magnetically readable medium (e.g., CD, DVD, magnetic disk, magnetic tape, or the like). It should be appreciated that the storage device and the storage medium are embodiments of a machine readable storage device adapted to store one or more programs that include instructions that, when executed, implement the embodiments of the disclosure. The embodiments provide a program and a machine readable storage device storing such a program, the program including code for implementing the device or method of any of the claims of the present disclosure. Moreover, these programs may be electrically transmitted via any medium (for example, a communication signal carried via a wired connection or a wireless connection) and various embodiments suitably include such programs.

Those skilled in the art will appreciate that various combinations and/or incorporations of the various features recited in the various embodiments and/or claims of the present disclosure may be made even if such combinations or incorporations are not explicitly described in the present disclosure. In particular, various combinations and/or incorporations of the features of the various embodiments and/or claims of the disclosure may be made without departing from the spirit and scope of the disclosure. All such combinations and/or incorporations will fall within the scope of the disclosure.

Although the present disclosure has been shown and described with respect to the specific exemplary embodiments of the present disclosure, it will be understood by those skilled in the art various changes in form and detail may be made to the disclosure. Therefore, the scope of the disclosure is not only defined by the appended claims, but also by the equivalents thereof.

What is claimed is:

1. A processor checking method, comprising:
   acquiring a first access record of a processor to a first memory during a running process, the first access record comprising reading-operation information;
   acquiring a second access record of a checking device to a second memory during a replay process, wherein the checking device executes a task of the running process in a manner conforming to predefined behavior during the replay process, wherein the predefined behavior is a hardware behavior standard of the processor, wherein the second access record comprises first reading-operation information, the first reading-operation information comprising the reading-operation information corresponding to a case in which a first access of the checking device to a same address during the replay process is a reading operation;
   determining, during the running process, based on the first access record and the second access record, whether the processor reads a memory address that is not one or more addresses included in the second access record; and determining whether data stored at the memory address is sensitive data predefined by a user, according to a data format of the data stored at the memory address, when the processor reads during the running process the memory address that is not the one or more addresses included in the second access record.

2. The method according to claim 1, wherein when the processor is a multi-core processor, the first access record further comprises an identifier of a processor core to which the reading-operation information relates.

3. The method according to claim 1, further comprising: saving relevant operation information about reading the memory address and issuing a security forewarning message to the user, when the processor reads during the running process the memory address that is not the one or more addresses included in the second access record.

4. The method according to claim 1, further comprising: determining whether the memory address falls within a preset address range, when the processor reads during the running process the memory address that is not the one or more addresses included in the second access record.

5. The method according to claim 4, wherein when the processor is a multi-core processor, the first access record further comprises an identifier of a processor core to which the reading-operation information relates.

6. The method according to claim 4, further comprising: saving relevant operation information associated with reading the memory address and issuing a security forewarning message to the user, when the processor reads during the running process the memory address that is not the one or more addresses included in the second access record.

7. The method according to claim 1, further comprising: outputting the reading-operation information corresponding to the memory address to optimize a corresponding program code, when the processor reads during the running process the memory address that is not the one or more addresses included in the second access record; or determining a position where the reading-operation information corresponding to the memory address is executed in a program, and outputting information of the position to optimize the corresponding program code, when the processor reads during the running process the memory address that is not the one or more addresses included in the second access record.

8. The method according to claim 1, further comprising: determining whether a behavior of the processor reading the memory address is an unauthorized operation, when the processor reads during the running process the memory address that is not the one or more addresses included in the second access record.

9. The method according to claim 1, wherein when the processor is a multi-core processor, the first access record further comprises an identifier of a processor core to which the reading-operation information belongs.

10. The method according to claim 1, further comprising: saving relevant operation information about reading the memory address and issuing a security forewarning message to a user, when the processor reads during the running process the memory address that is not the one or more addresses included in the second access record.

11. The method according to claim 1, wherein instructions for executing the method are stored in a non-transitory computer readable storage medium.

12. A checking system for checking a processor to be checked, comprising:

one or more checking processors; and a storage configured to store one or more programs, wherein the one or more checking processors are configured to execute a processor checking method when the one or more programs are executed by the one or more checking processors, wherein the processor checking method comprises:

acquiring a first access record of a processor to a first memory during a running process, the first access record comprising reading-operation information;

acquiring a second access record of a checking device to a second memory during a replay process, wherein the checking device executes a task of the running process in a manner conforming to predefined behavior during the replay process, wherein the predefined behavior is a hardware behavior standard of the processor, wherein the second access record comprises first reading-operation information, the first reading-operation information comprising the reading-operation information corresponding to a case in which a first access of the checking device to a same address during the replay process is a reading operation;

determining, during the running process, based on the first access record and the second access record, whether the processor reads a memory address that is not one or more addresses included in the second access record; and determining whether data stored at the memory address is sensitive data predefined by a user, according to a data format of the data stored at the memory address, when the processor reads during the running process the memory address that is not the one or more addresses included in the second access record.

\* \* \* \* \*